US012650064B2

(12) United States Patent
Fletcher et al.

(10) Patent No.: US 12,650,064 B2
(45) Date of Patent: Jun. 9, 2026

(54) SENSORLESS GAS CONTROL FOR ELECTRIC SUBMERSIBLE PUMP

(71) Applicant: ChampionX LLC, Sugar Land, TX (US)

(72) Inventors: Christopher Fletcher, Moore, OK (US); Brian Haapanen, Broken Arrow, OK (US)

( * ) Notice: Subject to any disclaimer, the term of this patent is extended or adjusted under 35 U.S.C. 154(b) by 0 days.

(21) Appl. No.: 18/932,355

(22) Filed: Oct. 30, 2024

(65) Prior Publication Data

US 2025/0137364 A1      May 1, 2025

Related U.S. Application Data

(60) Provisional application No. 63/594,752, filed on Oct. 31, 2023.

(51) Int. Cl.
*E21B 43/12*          (2006.01)
*G05D 7/06*          (2006.01)

(52) U.S. Cl.
CPC ......... *E21B 43/128* (2013.01); *G05D 7/0623* (2013.01); *G05D 7/0676* (2013.01)

(58) Field of Classification Search
CPC .. G05D 7/0623; G05D 7/0676; E21B 43/128; E21B 47/008
See application file for complete search history.

(56) References Cited

U.S. PATENT DOCUMENTS

| | | | |
|---|---|---|---|
| 3,841,793 A | 10/1974 | MacManus | |
| 4,935,685 A | 6/1990 | Justus et al. | |
| 5,015,151 A | 5/1991 | Snyder, Jr. et al. | |
| 6,586,900 B2 * | 7/2003 | Rider | F04D 15/0088 |
| | | | 318/459 |
| 7,117,120 B2 | 10/2006 | Beck et al. | |
| 7,798,215 B2 * | 9/2010 | Leuthen | E21B 47/008 |
| | | | 166/250.15 |
| 8,417,483 B2 * | 4/2013 | Anderson | E21B 47/047 |
| | | | 702/182 |

(Continued)

FOREIGN PATENT DOCUMENTS

| | | |
|---|---|---|
| CN | 112825103 A | 5/2021 |
| EP | 4159972 A1 | 4/2023 |
| WO | 97/08459 | 3/1997 |

OTHER PUBLICATIONS https://web.archive.org/web/20210506195611/https://artesis.com/motor-current-signature-analysis/ (Year: 2021).*

(Continued)

*Primary Examiner* — Anthony Ayala Delgado
(74) *Attorney, Agent, or Firm* — Scheef & Stone, L.L.P.; Keith C. Rawlins, Esq.

(57)          ABSTRACT

Measuring and actively managing gas production in a downhole electrical submersible pump, such as for liquid hydrocarbon well production. A controller monitors pump motor electrical current data and performs a motor current signature analysis to calculate a Gas Production Index (GPI) value indicating a relative amount of gas being produced by the well at a particular time. The controller then responsively uses the calculated present GPI value as a synthetic process variable in a closed control loop, by dynamically adjusting the pump motor speed to achieve a target amount of liberated gas as estimated by a future GPI value.

18 Claims, 4 Drawing Sheets

(56) References Cited

U.S. PATENT DOCUMENTS

| | | | |
|---|---|---|---|
| 9,057,256 | B2 | 6/2015 | Ige et al. |
| 10,087,946 | B2 | 10/2018 | Wylie |
| 10,267,317 | B2 | 4/2019 | Lopes et al. |
| 10,697,293 | B2 | 6/2020 | Nemoto et al. |
| 11,353,029 | B2 | 6/2022 | Hoefel et al. |
| 2009/0044938 | A1* | 2/2009 | Crossley ............ G05B 23/0243 |
| | | | 166/250.15 |
| 2015/0056082 | A1 | 2/2015 | Barrios et al. |
| 2018/0195373 | A1* | 7/2018 | Bell ....................... E21B 47/008 |
| 2021/0071509 | A1* | 3/2021 | Beck ..................... F04B 49/065 |
| 2021/0164328 | A1* | 6/2021 | Redmond ............. E21B 47/008 |
| 2021/0262327 | A1* | 8/2021 | Berland .................. E21B 43/34 |
| 2023/0098068 | A1 | 3/2023 | Peterson |

OTHER PUBLICATIONS

Lu Li, Chenquan Hua et al., Condition monitoring and fault diagnosis of electric submersible pump based on wellhead electrical parameters and production parameters, Systems Science & Control Eng'g, 2018, pp. 253-261, vol. 6, Informa UK Limited (Taylor & Francis Group).

International Search Report and Written Opinion issued for PCT/US2024/053922 dated Jan. 14, 2025; 16 pgs.

* cited by examiner

<u>100</u>

200

300

FIG. 4                                                    400
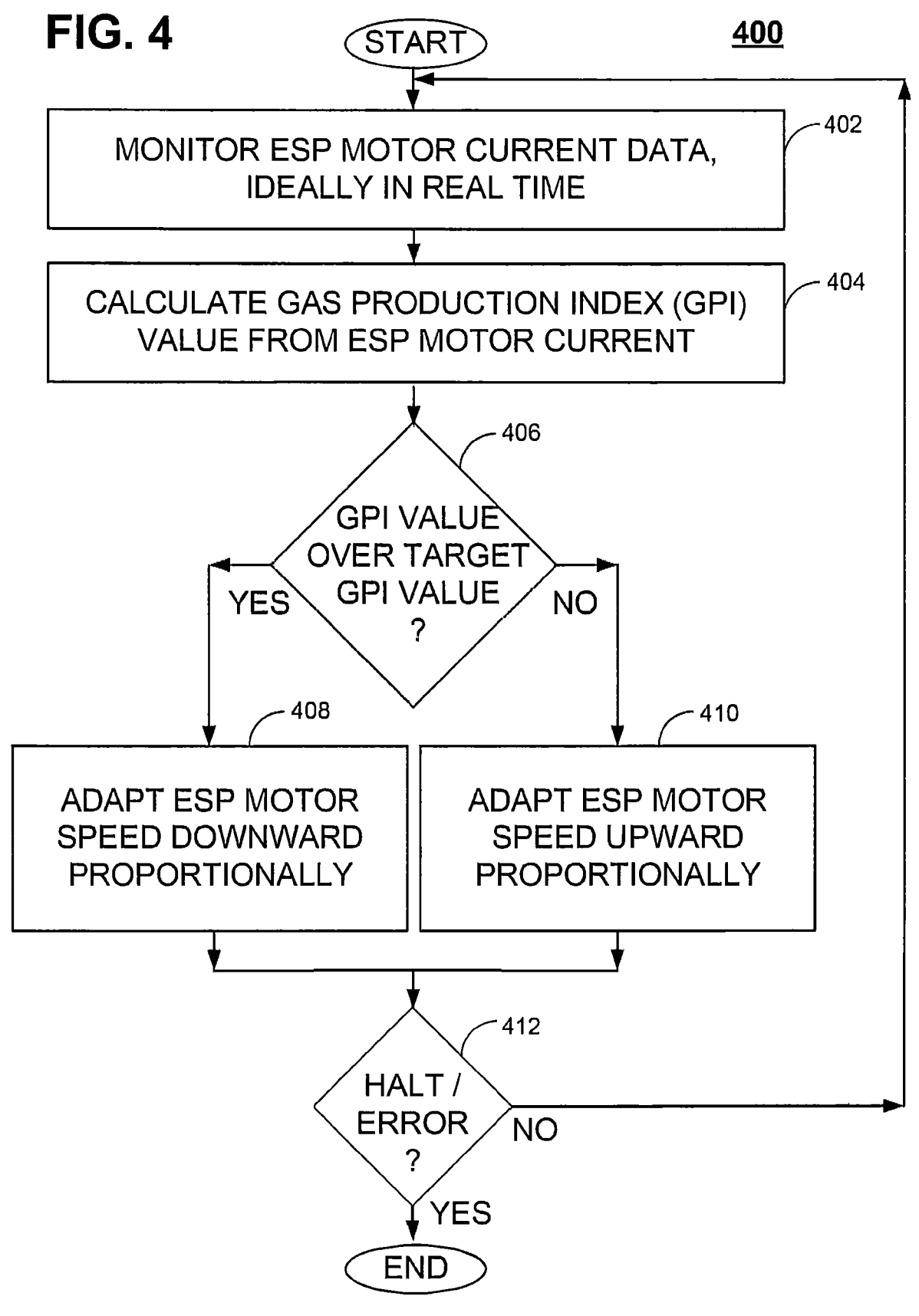

SENSORLESS GAS CONTROL FOR ELECTRIC SUBMERSIBLE PUMP

CROSS-REFERENCE TO RELATED APPLICATIONS

This application is a non-provisional patent application claiming the benefit of, and priority to, U.S. Provisional Patent Application No. 63/594,752, filed Oct. 31, 2023, which is incorporated by reference herein in its entirety.

FIELD OF THE DISCLOSURE

The present disclosure generally relates to the field of downhole pump operation, such as for liquid hydrocarbon production or dewatering. More specifically, the present disclosure relates to measuring and managing gas production in electric submersible pump (ESP) applications.

BACKGROUND

In the oil and gas industry, a wellbore may be drilled into a subterranean formation to produce liquid hydrocarbons (e.g., crude oil) from a producing portion of the subterranean formation. An artificial lift system may then be used to pump fluids through the wellbore, and up to a wellhead located at the surface of the earth. ESPs are an example of an artificial lift system. ESPs can use a hermetically sealed electric motor to drive a multi-stage mechanical pump that pumps oil and gas from the subterranean formation to the wellhead. ESPs are often suspended in a wellbore and connected to the surface by a cable that also provides electrical power to the ESP motor. The pump driven by the motor can be multi-stage centrifugal pump including stacked impeller and diffuser stages.

During production, some wells produce gas along with liquid hydrocarbons. The gas could be dissolved in the liquid hydrocarbons to some extent or could occur in distinct accumulations known as "slugs" or "pockets" that move from the producing portion of the subterranean formation into the wellbore. This phenomenon often occurs when wells include slanted or horizontal portions, which is an increasingly prevalent situation in the industry. As such, there is a tendency for the gas to enter the pump along with the liquid, which may decrease the fraction of liquid lifted. That is, the gas in a well often causes the pump to lift a mixture of gas and liquid instead of only liquid.

Gas entering an ESP can cause various difficulties, especially when a transient slug of gas is produced. In some operating environments, gas slugs that persist for at least ten seconds are repeatedly experienced. Some gas slugs may persist for as much as thirty seconds or more. The ESP rotates at high speed (e.g., about 3600 RPM) and may rely on the continuous flow of reservoir liquid to both cool and lubricate its bearing surfaces and stator windings. When the continuous flow of reservoir liquid is interrupted, even for a brief period, the bearings and stator windings of the ESP may heat up rapidly and undergo significant wear and degradation, shortening the operational life of the ESP. Excessive gas interference with regular pump operation not only reduces production efficiency but may eventually lead to a worst-case scenario where the pump is completely filled with gas ("gas locked"). In such an event, the ESP is no longer able to pump any liquid to the surface as a result of the gas. Failure to quickly resolve a gas-locked ESP can also lead to overheating and premature pump failure.

One approach to managing the presence of gas in a well designed to produce liquid hydrocarbons is to ignore the issue by just continuing the setpoint pump operation as set for liquid. Maintaining existing pump speed in the presence of gas interference reduces the liquid production rate. Further, production equipment is operated longer to produce a given volume of oil when liquid pump lifting is reduced. Thus, equipment wear and related repairs exacerbate the problem of reduced revenues by increasing expenses.

Another approach to managing the presence of gas in a well designed to produce liquid hydrocarbons is to use a gas lock recovery mode of operation, which can be triggered when the ESP motor current deviates from a configurable set point threshold. This alarm condition indicates the ESP motor is not pumping the desired amount of liquid. The response can be for the controller to fluctuate the motor speed to try to clear the gas from the pump. If this mode does not work, the controller may then stop the motor and wait a prescribed time to restart, allowing the well to refill and the gas to clear.

Yet another approach to managing the presence of gas in a well designed to produce liquid hydrocarbons is to utilize various downhole instruments (e.g., a downhole gauge) placed for well management to gather downhole data that can inform the well operator what is happening to the pump with a time delay typically of 5 to 30 seconds. Not only is the downhole data not received in real time, but the downhole instrumentation may also be subjected to extremes of pressure, temperature, corrosion, vibration, and other potentially damaging conditions-leading to failure, requiring maintenance and repair of the instrumentation or typically continuing to operate the well without process information.

There are methods to directly measure gas and fluid flows in real time at the surface, such as using multiphase flow meters.

An improved method for proactively measuring and managing gas production in ESPs without adding downhole sensors would be advantageous.

SUMMARY

Disclosed herein is a method for controlling gas production from a well, including: measuring data describing an electrical current provided to a downhole electrical submersible pump motor; calculating a Gas Production Index value indicating a relative gas production level of the well based on a signature analysis of the measured motor current data; and in response to a comparison of the calculated Gas Production Index value against a target Gas Production Index value, adjusting a speed of the motor to control the relative gas production level.

Also disclosed herein is a non-transitory computer-readable storage medium having embedded therein a set of instructions which, when executed by one or more processors of a computer, causes the computer to execute operations for controlling gas production from a well, the operations including: measuring data describing an electrical current provided to a downhole electrical submersible pump motor; calculating a Gas Production Index value indicating a relative gas production level of the well based on a signature analysis of the measured motor current data; and in response to a comparison of the calculated Gas Production Index value against a target Gas Production Index value, adjusting a speed of the motor to control the relative gas production level.

Further disclosed is a system for controlling gas production from a well, including: using a controller: measuring data describing an electrical current provided to a downhole electrical submersible pump motor; calculating a Gas Production Index value indicating a relative gas production level of the well based on a signature analysis of the measured motor current data; and in response to a comparison of the calculated Gas Production Index value against a target Gas Production Index value, adjusting a speed of the motor to control the relative gas production level by actuating a variable-frequency drive that modifies electrical power signals provided to the motor.

Also disclosed herein is an apparatus for controlling gas production from a well, including: a downhole electrical submersible pump motor; a variable-frequency drive that provides electrical power signals to the pump motor; and a controller configured to: measure data describing an electrical current provided to the motor; calculate a Gas Production Index value indicating a relative gas production level of the well based on the measured motor current data; and in response to a comparison of the calculated Gas Production Index value against a target Gas Production Index value, adjust a speed of the motor to control the relative gas production level by actuating the variable-frequency drive to modify the electrical power signals provided to the motor.

Other technical features may be readily apparent to one skilled in the art from the following figures, descriptions and claims.

BRIEF DESCRIPTION OF THE DRAWINGS

For a more complete understanding of this disclosure, reference is now made to the following description, taken in conjunction with the accompanying drawings, in which:

FIG. 4 is a diagram of the logic operations performed by the controller for an ESP system according to one aspect.

DETAILED DESCRIPTION

Figure 1:
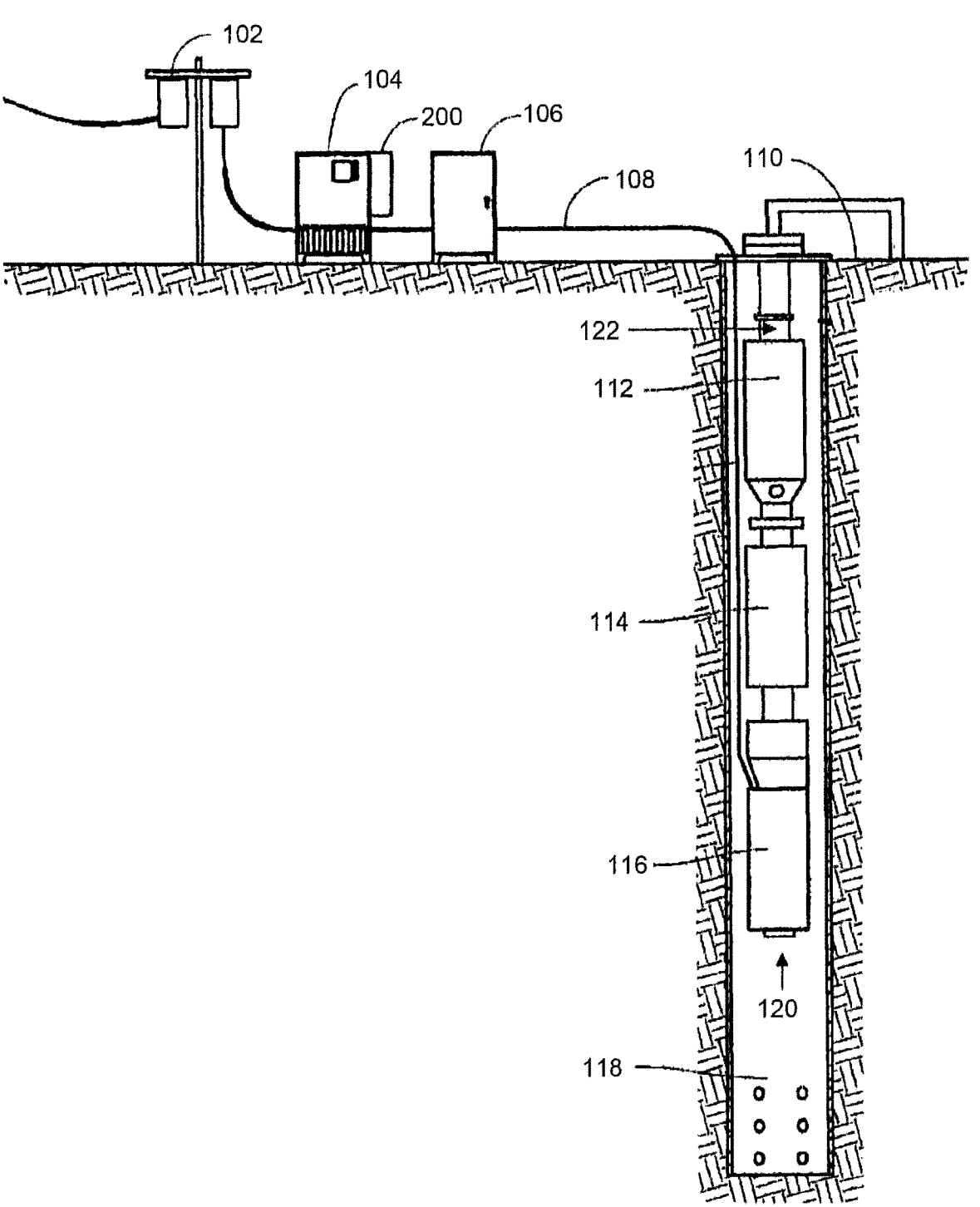
FIG. 1 is a side elevational view of an ESP system for producing fluids from a subterranean formation through a wellbore up to the surface at a well site.

The term "hydrocarbon fluids" refers to a hydrocarbon or mixtures of hydrocarbons that are gases, liquids, or both gases and mixtures. For example, hydrocarbon fluids may include a hydrocarbon or mixtures of hydrocarbons that are gases or liquids at formation conditions, at processing conditions, or at ambient conditions. Hydrocarbon fluids may include compounds composed primarily of carbon and hydrogen atoms. Compounds containing other elements, such as, but not limited to, halogens, metallic elements, nitrogen, oxygen, and/or sulfur can also be present in hydrocarbon fluids. Hydrocarbon fluids may include, for example, oil, natural gas, oil, and other hydrocarbons that are in a gaseous or liquid state.

The term "subterranean formation" refers to geologic strata occurring below the earth's surface. A subterranean formation may contain one or more hydrocarbon-containing layers, one or more non-hydrocarbon containing layers, one or more layers containing hydrocarbon(s) and non-hydrocarbon(s), an overburden, and/or an underburden of any geologic formation.

The term "wellbore" refers to a hole in the subterranean formation made by drilling or insertion of a conduit into the subterranean formation. A wellbore may have a circular cross section, or other cross-sectional shapes.

The term "well" when referring to an opening in the formation, may be used interchangeably with the term "wellbore." The term "bore" refers to the opening formed in the subterranean formation by the drilling process.

The term "real time" refers to the speed of data transfer between the variable-frequency drive (VFD) and controller of an ESP, typically one second or faster, that does not include any time delay typically associated with downhole instruments (e.g., a downhole gauge) that gathers downhole data indicative of what is happening to an electric submersible pump. "Real time" can additional or alternatively refer to those data transfer speeds that can be referred to as "near real time" or "substantially real time," for example, having a delay in data transfer speed due to unavoidable latency in computer components (e.g., a cable connecting the computer components or a processor, etc.). "Real time" also describes the processor and software response to the "real time" data, which is typically on the order of microseconds or milliseconds.

Disclosed is new approach to both measuring and managing gas in a downhole electrical submersible pump, such as for liquid hydrocarbon production from a well or dewatering for gas production. "Dewatering" a subterranean formation can cause natural gas to be released. Typically this "water" is a varied ratio combination of hydrocarbons and brine composed of various dissolved compounds (salts and other water soluble compounds).

Briefly, the approach is to analyze patterns or signatures in the time-series data values of the measured electric current provided to the ESP motor, and to calculate a dimensionless process parameter referred to herein as a Gas Production Index (GPI) denoting a relative amount of gas in the well from the analyzed motor current values. A controller then modulates the rotational speed of the ESP motor such that the calculated Gas Production Index value is adjusted toward a target value of the Gas Production Index. The motor can then be operated at the adjusted value. The target value for the Gas Production Index may be set to continually remove a quantity of gas from the well to avoid development of an excessive gas interference or gas lock scenario in the pump. The quantity of gas removed by the target value can be in a range from a minimum value where no gas is removed to maximum value that causes a gas lock condition. In cases where some gas production may be desirable, allowable or unavoidable, the disclosed techniques can control how much gas interference is allowed in the ESP. The approach uses the ESP motor as a synthetic downhole instrument, which can be used to continuously and qualitatively measure and also control the amount of liberated gas in the pump in real time. The disclosed technique avoids a need for additional instrumentation (e.g., including but not limited to, current transformers or power monitoring/analysis equipment) because the motor serves as both a sensor and an actuator.

Controllers can be designed for vertical wells, where fluid entry into the wellbore tends to be steady and not often plagued by gas. In a horizontal gassy well however, slug flow will more frequently occur (which is influenced by the fluid level in the well), potentially causing alternating downhole pump conditions of predominantly liquid and then predominantly gas. This pattern may confuse some controllers and actually lead to would-be corrective actions that are opposite to what is really effective, and thus are counterproductive. Fluid level is one variable that can determine the pressure in the well and at the pump intake. Lower pressure can encourage more gas release from the subterranean formation than a higher pressure.

More generally, controllers that merely react to alarm conditions based on various threshold values being crossed do not provide dynamic closed-loop control focused expressly on maintaining a target level of gas production. This disclosure provides a controller that provides dynamic closed-loop control of an ESP, via ongoing sensing and active control of the ESP motor speed according to a calculated dimensionless index indicating a relative measure of gas production. The Gas Production Index is based on an ESP motor current signature analysis and does not require any typical downhole sensors/gauges nor any specialized DSP (Digital Signal Processing) computing capacity for processing the data generated by downhole or surface sensors.

FIG. 1 illustrates a side elevational view of an ESP system 100, such as for producing hydrocarbon fluids from a subterranean formation through a wellbore up to the surface at a well site. An alternating current power source 102, a variable-frequency drive (VFD) 104 (sometimes called a variable-speed drive), a transformer 106, a cable 108, and a controller 200 can be located on the surface 110 of the earth. The alternating current power source 102 may comprise an electrical power line (electrically coupled to a power utility plant) or a generator electrically coupled to and providing typically three-phase power to the variable-frequency drive 104.

A pump 112, a motor 116, and a seal assembly 114 between the pump 112 and the motor 116 are located within a wellbore 118. The motor 116 is electromechanically coupled to and drives the pump 112, which induces the flow of gas and liquid up the wellbore 118 to the surface 110 for further processing. The motor 116 provides mechanical torque to drive shafts, which provide mechanical power to the pump 112.

Pump 112 may comprise, for example, a multi-stage centrifugal pump having a plurality of rotating stages which increase the pressure level of the well fluids for pumping the fluids to the surface 110. The upper end of the pump 112 is connected to the lower end of a discharge line 122 for transporting well fluids from a pump intake 120 to a desired location. The ESP assembly is depicted vertically but may be in a different orientation depending on well direction (e.g., horizontal, bent, curved, etc.). Production fluid enters the wellbore 118 through perforations below the pump intake 120.

In an aspect, the controller 200 controls the operating speed of the motor 116 by changing the electrical power provided to the motor 116 via the cable 108. For example, the controller may actuate the variable-frequency drive 104 to modify the voltage waveforms the variable-frequency drive 104 provides to the motor 116. Typically, a variable-frequency drive 104 will convert input alternating electrical power to direct current electrical power, then generate alternating waveforms of programmed voltage and frequency to drive a load under its control. The transformer 106 electrically couples the variable-frequency drive 104 and the motor 116, and steps voltage waveforms up as required.

Figure 2:
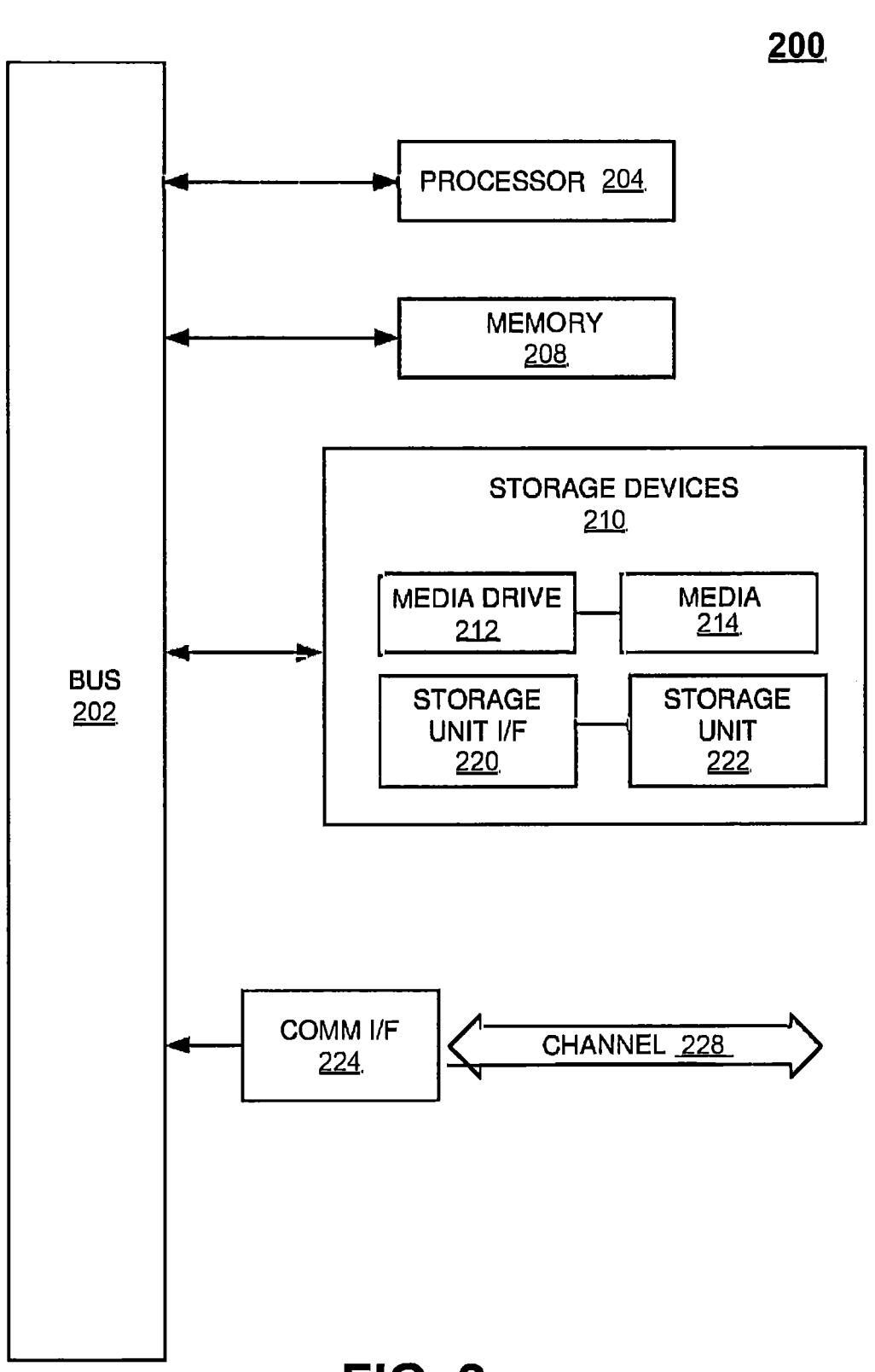
FIG. 2 is a diagram of a controller for an ESP system according to one aspect.

FIG. 2 illustrates a diagram of the controller 200 for the ESP system 100 according to one aspect. The controller 200 may carry out the functionality described herein. The controller 200 may represent, for example, computing or processing capabilities found within desktop, laptop and notebook computers, hand-held computing devices (personal digital assistants (PDAs), smart phones, cell phones, palmtops, etc.), mainframes, supercomputers, workstations or servers, or any other type of special-purpose computing devices as may be desirable or appropriate for a given application or environment. The controller 200 might also represent computing capabilities embedded within or otherwise available to a given device.

The controller 200 might include, for example, one or more processors, controllers, control components, or other processing devices, such as a processor 204. Processor 204 might be implemented using a special-purpose processing engine such as, for example, a microprocessor, controller, or other control logic. In the illustrated example, processor 204 is connected to a bus 202, although any communication medium may be used to facilitate interaction with other components of the controller 200 or to communicate externally.

The controller 200 might also include one or more memory components, referred to herein as main memory 208. For example, random access memory (RAM) or other dynamic memory, might be used for storing information and instructions to be executed by processor 204. Main memory 208 might also be used for storing temporary variables or other intermediate information during execution of instructions to be executed by processor 204. The controller 200 might likewise include a read only memory (ROM) or other static storage device coupled to bus 202 for storing static information and instructions for processor 204.

The controller 200 might also include one or more various forms of information storage mechanism 210, which might include, for example, a media drive 212 and a storage unit interface 220. The media drive 212 might include a drive or other mechanism to support fixed or removable storage media 214. For example, a hard disk drive, a floppy disk drive, a magnetic tape drive, an optical disk drive, a compact disc (CD) or digital versatile disc (DVD) drive (read-only or read/write), or other removable or fixed media drive might be provided. Accordingly, storage media 214 might include, for example, a hard disk, a floppy disk, magnetic tape, cartridge, optical disk, a CD or DVD, or other fixed or removable medium that is read by, written to or accessed by media drive 212. As these examples illustrate, the storage media 214 may include a computer usable storage medium having stored therein computer software or data.

Generally, where components of the technology described are implemented in whole or in part using software in one aspect, these software elements may be implemented to operate with a computing or processing component capable of carrying out the functionality described. In aspects, the controller 200 shown in FIG. 2 as a single computing component may be embodied as multiple such components.

In alternative aspects, information storage mechanism 210 might include other similar instrumentalities for allowing computer programs or other instructions or data to be loaded into the controller 200. Such instrumentalities might include, for example, a fixed or removable storage unit 222 and a storage unit interface 220. Examples of such storage units 222 and storage unit interfaces 220 may include a program cartridge and cartridge interface, a removable memory (for example, a flash memory or other removable memory component) and memory slot, a personal computer memory card international association (PCMCIA) slot and card, and other fixed or removable storage units 222 and storage unit interfaces 220 that allow software and data to be transferred from the storage unit 222 to the controller 200.

The controller 200 might also include a communications interface 224. Communications interface 224 might be used to allow software and data to be transferred between the controller 200 and external devices. Examples of communications interface 224 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 224 might typically be carried on signals, which may be electronic, electromagnetic (which includes optical) or other signals capable of being exchanged by a given communications interface 224. These signals might be provided to communications interface 224 via a channel 228. This channel 228 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 208, storage unit 220, interface 220, media 214, and channel 228. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the controller 200 to perform features or functions of the disclosed technology as discussed herein.

For example, the controller 200 may include one or more processors, memory, and instructions stored on the memory that cause the one or more processors to receive and analyze specific signals from one or more sensors, including a variable-frequency drive, associated with operation of the ESP system 100. The sensors yield signals encoding values associated with the various parameters being measured. The sensors could, for example, provide time-series data on the electric current provided to the ESP motor 116 in real time. Time series data of the electric current provided to the ESP motor may be provided via Channel 228 in real time. The controller 200 may display and store values with an associated time stamp.

The controller 200 may comprise an interface with display and input means for on-site well management, or may be able to provide such functionality remotely, such as via the internet. For example, the controller 200 may be networked with any of the sensors and actuators for programmatic control of the motor 116 via wireless or wired data transmission networks (e.g., Wi-Fi, Bluetooth, NFC, Ethernet cables, or combinations thereof).

In aspects, the controller 200 may comprise a programmable logic controller that can be programmed to perform the functionality required to dynamically manage gas production. PID algorithms are widely used to implement continuously modulated control by employing feedback. A PID controller continuously calculates an error value as the difference between a desired target control variable value and a measured process variable value, and applies a correction based on proportional, integral, and derivative terms. PID systems automatically apply accurate and responsive corrections with minimal delay and overshoot.

In this application, the controller 200 may be programmed to proactively and continually manage a gas interference condition using the disclosed approach. The controller 200 repeatedly monitors the data sent from sensors describing electric motor current values during ESP system 100 operation. The data transmission from sensors and the monitoring by the controller 200 may each be continuous, periodic, or intermittent, or any combinations thereof. The controller 200 may observe the sensor data for a span of time (e.g., minutes or hours) or for a number of data samples to more clearly identify significant changes in motor current data that may appear and disappear.

The controller 200 may process motor current data, and estimate relative gas production levels in the well, which could lead to excessive gas interference or even gas lock if not addressed. In response to a comparison or comparing between the estimated gas production level and a target gas production level, the controller 200 may then responsively select specific and appropriate corrective actions to apply, via actuators, for specific downhole conditions accordingly. For example, the controller 200 may output control signals that, via actuators, control of one or more pieces of the equipment of the ESP system 100 to cause the ESP motor speed to vary controllably. Typically the controller 200 will utilize the variable-frequency drive 104 to effect motor 116 speed changes via modifications to the electrical power waveforms provided to the motor 116. The controller 200 may also adjust operation of a surface valve control device (e.g., a position of a choke valve, an annular pressure regulator, or both) to control tubing backpressure. Controlling the tubing backpressure can control gas bubble size in the liquid, which in turn, can control an amount of the gas that is dissolved in the liquid phase of the well fluid. Thus an aspect of this disclosure includes, in response to a comparison of or comparing a calculated Gas Production Index value against a target Gas Production Index value, adjusting the solubility of gas in liquid by regulating pressure in the well (e.g., by adjusting a surface valve control device), in addition to or in alternative to adjusting the motor speed. In aspects, the adjustments are performed without use, measurement, or knowledge of discharge pressure of the ESP and is only based on signature analysis of measured motor current data according to the techniques described herein.

The motor current may vary considerably as multiple slugs of gas are emitted sporadically from the hydrocarbon-containing layer and move through the ESP system 100, particularly in wells having non-vertical components. Patterns of gas production in the downhole pump, typical for gas interference as described, may be recognized from patterns in motor current data. Such observed patterns may match patterns created by physics-based simulations, for example, used to mimic the behavior of gassy wells.

Motor current signature analysis, which is typically used in unrelated motor current monitoring applications, typically relies on specialized measurement equipment and very high data sampling rates. For example, digital signal processing (DSP) computing power to calculate fast Fourier transforms (FFTs) and other mathematical methods of analysis for detecting bad bearings or off-balance rotating parts may be prohibitively costly and add complexity. This disclosed aspects for the method, medium, and apparatus therefore provide a less complicated technique of performing a motor current signature analysis for sensorless gas control of an ESP.

This application uses the motor, via its measurable electrical current, as a synthetic instrument to calculate a relative magnitude or index of gas produced by the well and flowing through the pump. The Gas Production Index becomes a process value which may be controlled, in one aspect with a PID control loop. The ideal Gas Production Index value results from keeping the well fluid level at an ideal point. At this ideal fluid level point, gas is liberated to some extent, which represents a desirable operating range where the pump can tolerate gas production.

If the well fluid level is pumped down below the ideal fluid level point, gas liberation will increase and cause increasing gas interference, perhaps worsening until the ESP becomes gas locked. Thus, there is some relative level of gas production (and corresponding motor current response) that will maintain the ideal well fluid level and prevent gas interference from worsening and becoming gas lock. Rather than measuring the well fluid level or gas production quantity or even ESP motor speed directly, the approach of this disclosure estimates relative gas production from analysis of the measured motor current.

In one aspect, the pump motor speed (via the measured motor current) may be used as the control variable. In an additional or alternative aspect, a position of a choke valve may serve as the control variable. In an additional or alternative aspect, an annulus pressure may serve as the control variable, implemented via an electronic or manual pressure regulator. Thus, the control variable that is adjusted can be the pump motor speed, a position of a choke valve, an annulus pressure, or combinations thereof.

First, the controller 200 may calculate an actual motor current $i_c$ from the measured motor current data by adjusting the measured motor current data from the variable-frequency drive 104, step up transformer 106 impedance ratio, cable 108 resistance, and temperature, as may be known in the art with the assistance of this disclosure. Next, the controller 200 may filter the calculated motor current data $i_c$ to reduce noise in the data.

For example, the controller 200 may pass the actual motor current data through a software calculation (additionally or alternatively, an analog or digital integrated circuit) that rejects signals of a frequency higher than a predetermined cutoff frequency. That cutoff frequency may be denoted by a variable $\omega_{in}$, measured in radians per second. In control theory, such a cutoff frequency may be referred to as a lag frequency. The controller 200 may also implement such a filter mathematically, using computational signal processing approaches that are known in the art with the aid of this disclosure.

The controller 200 may then normalize the filtered motor current $i_f$ by calculating a ratio of filtered motor current $i_f$ to a maximum rated motor current $i_R$. The normalized motor current for data point n is thus $$I_{N_n} = \frac{i_f}{i_R}.$$

In one aspect, the controller 200 may then evaluate the monitored data gathered during s samples to determine a moving average of the normalized motor current data, where $n \geq (s+1)$. Other sample counts may also be used, such as five to 100 samples, to ensure clear indications may be obtained. The moving average normalized motor current is thus:

$$A_{I_n} = \frac{1}{s} \sum_{n-s}^{s+n} I_{N_n}$$

The controller 200 may then calculate a Gas Production Index quotient:

$$Q_n = \log \text{ of } \frac{A_{I_n}}{\sqrt{\frac{\sum_{n-s}^{s+n}(I_{N_n} - A_{I_n})^2}{s}}}.$$

The controller 200 may then calculate an unfiltered Gas Production Index as:

$$GPI_u = \left(\frac{G_p}{Q_n} - K_f\right) \times \left(\frac{Z_{max} - Z_{min}}{K_c - K_f}\right) + Z_{min},$$

where $G_p$ comprises a Gas Production Index gain, $K_f$ comprises a noise floor constant, $Z_{max}$ comprises a maximum scale constant, $Z_{min}$ comprises a minimum scale constant, and Kc comprises a noise ceiling constant. The controller 200 may then filter the unfiltered Gas Production Index to yield the Gas Production Index (GPI). As with the input data, the controller 200 may pass the unfiltered GPI data through an analog or digital integrated circuit or programmatic computation that rejects signals of a frequency higher than a predetermined cutoff frequency. That cutoff frequency may be denoted by a variable Wout, measured in radians per second. The controller 200 may also implement such a low-pass filter mathematically, using computational signal processing approaches that are known in the art with the aid of this disclosure. To summarize:

Variable Definitions

GPI, Gas Production Index
$GPI_u$, Gas Production Index Prior to Low-Pass Output Filter
$I_N$, Normalized Motor Current
$i_f$, Filtered Motor Current
$i_R$, Motor Rated Current
$i_c$, Calculated Motor Current
s, Total Number of Discrete Data Samples
n, Sample Number
$A_{I_n}$, Motor Current Moving Average of n samples
$\omega_{in}$, Input Filter Cutoff Frequency in radians/second
$\omega_{out}$, Output Low-Pass Filter Cutoff Frequency in radians/second
$Q_n$, GPI Quotient
$G_p$, GPI Predictor Gain
$K_f$, Noise Floor Constant
$K_c$, Noise Ceiling Constant
$Z_{max}$, Maximum Scale Constant
$Z_{min}$, Minimum Scale Constant
Calculation Method
$i_c$ is passed through a filter with a suitable $\omega_{in}$ to calculate $i_f$
Normalized Motor Amps:

$$I_{N_n} = \frac{i_f}{i_R}.$$

Motor Current Moving Average of s samples: where $n \geq (s+1)$, $$A_{I_n} = \frac{1}{s} \sum_{n-s}^{s+n} I_{N_n}.$$

GPI Quotient:

$$Q_n = \log \text{ of } \frac{A_{I_n}}{\sqrt{\dfrac{\sum_{n-s}^{s+n}\left(I_{N_n} - A_{I_n}\right)^2}{s}}}.$$

Gas Production Index, Unfiltered:

$$GPI_u = \left(\frac{G_p}{Q_n} - K_f\right) \times \left(\frac{Z_{max} - Z_{min}}{K_c - K_f}\right) + Z_{min}.$$

GPI$_u$ is passed through low-pass filter with a suitable $\omega_{out}$ to calculate GPI.

Gas Production Index:

The Gas Production Index (GPI) is a dimensionless relative value. A well that produces no gas at all will have some minimum value due to quiescent motor amperage signal noise, this can be nulled by the noise floor constant $K_f$, while a well that is approaching a gas lock condition will have some maximum value before gas lock response is triggered. In one aspect, the Noise Ceiling constant $K_c$, may be set at this maximum value for convenience of adjusting the GPI to an easily understandable range. The ideal Gas Production Index to be maintained as a process variable will be somewhere in between. The ideal Gas Production Index value may be selected to maximize continuous fluid production (e.g., liquid production, gas production, or a combination of liquid and gas production), to prevent damage to the motor 116, and to reduce gas interference to prevent gas lock and to avoid reactive gas lock recovery schemes.

The Gas Production Index value enables qualitative measurement and control of a fluid level in the well and a pump intake pressure, which influence gas liberation. No complex well modeling, chemistry, or physics equations are necessary to determine an appropriate intake pressure, fluid level, or both intake pressure and fluid level to achieve control of the bubble point of gas in the well fluid. The GPI is an empirical value calculated from motor current for a combination of complex equations. Because of this, changes in well temperature, gas solubility, well fluid constituents, or combinations thereof, are reflected in the GPI value. The disclosed technique controls the control variable(s) (e.g., motor speed, choke valve position, annulus pressure regulator setting, or combinations thereof) to seek the fluid level appropriate to the target GPI value, and the controller adjusts the control variable(s) disclosed herein when well conditions change, e.g., during the production decline curve.

Different wells and different production fields may behave differently, so the controller 200 may be programmed expressly to adapt its actions to the prevailing conditions rather than being locked into specific fixed Gas Production Index values. The controller 200 may comprise an artificial intelligence or machine learning algorithm that is expressly designed and trained to manage gas interference and other specific production conditions determined to exist (or not exist) from specific analyses of observed operational well data, such as motor current. In one aspect the Gas Production Index set point may be adjusted by Cloud based artificial intelligence or machine learning algorithms as well. Various controllers 200 on various wells in one or more production fields may transmit their data to a central controller that monitors and/or controls production conditions remotely, such as via the internet. Likewise, the controller 200 or a number of such controllers may monitor and/or control a group of wells expressly to ascertain the behavior of different hydrocarbon-producing layers.

Figure 3:
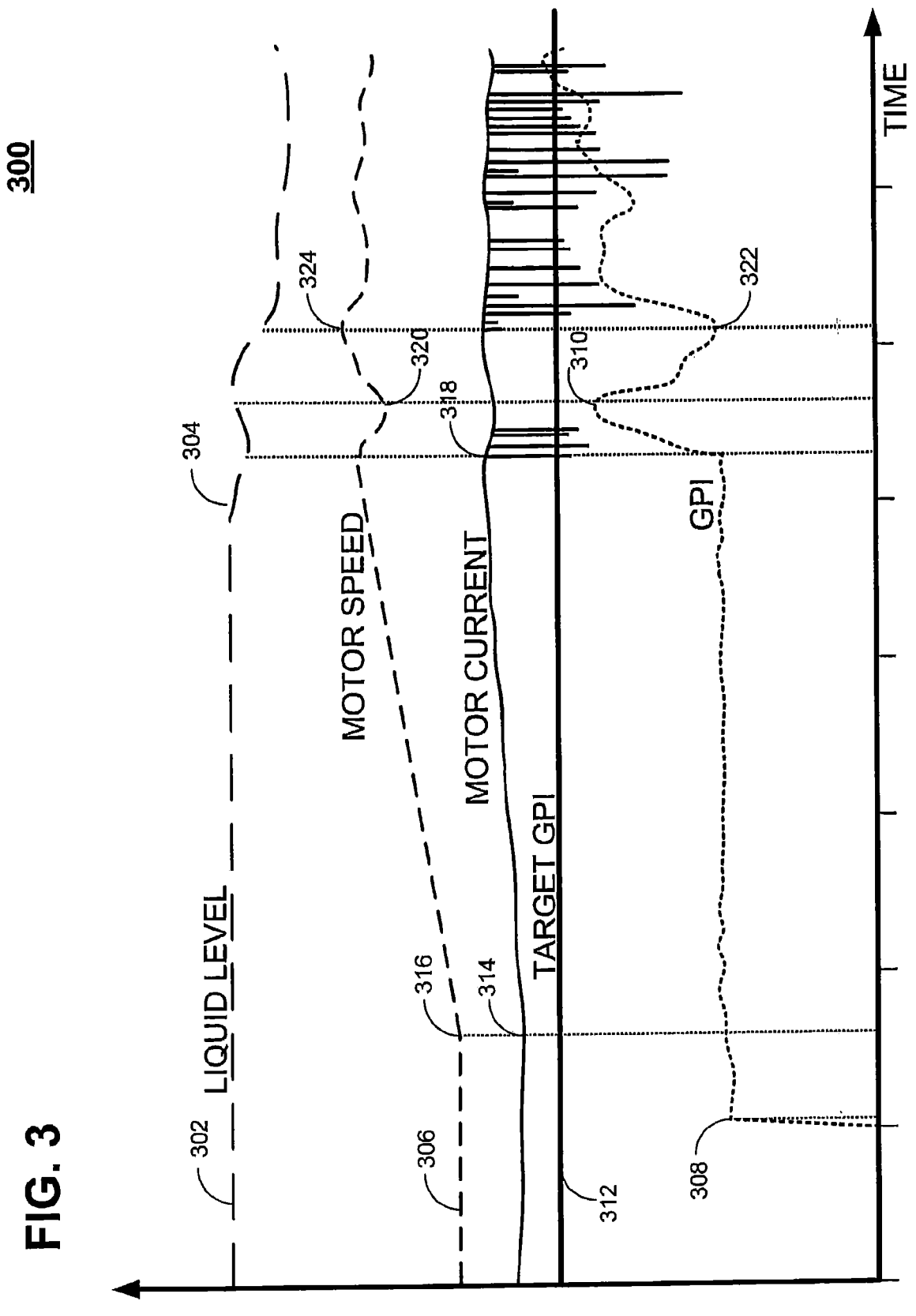
FIG. 3 is a diagram of motor current data analyzed by the controller for an ESP system according to one aspect.

FIG. 3 illustrates a diagram of a motor current data 300 analyzed by the controller 200 for an ESP system 100 according to one aspect. Different quantities are shown and labeled on the y-axis versus time on the x-axis, representing a typical well operation. The level of fluid in the well above the pump intake 120 is shown by line 302, and is shown decreasing at point 304 as the pump 112 begins pumping fluid out, though the level fluctuates somewhat. The pump 112 will not bring fluid to the surface 110 until it reaches sufficient speed, thus the well fluid line remains at maximum during a portion of the time when the motor 116 is speeding up.

The methodology described herein accumulates samples for some time as part of the Gas Production Index calculation. The calculated Gas Production Index value is temporarily set to zero until this sampling time has elapsed. During this time, the well may operate at a default ESP motor speed 306 used for liquid production, or at a motor speed set by a controller in a gas lock recovery mode.

At point 308, the methodology has calculated the Gas Production Index value (after processing sufficient samples), which is shown as remaining steady (until point 310 where it increases significantly, to be described). There is a time delay to allow the GPI calculation to stabilize.

As the methodology proceeds, the calculated Gas Production Index value will be adjusted to more closely approach the target Gas Production Index value 312. Initially, the Gas Production Index value is lower than the target Gas Production Index value, so the controller 200 takes steps to increase the speed of the motor 116. The increase in motor current starts at point 314, which results in a corresponding increase in motor speed beginning at point 316. The motor 116 lifts fluid up the wellbore 118 and out, which takes some time due to the motor 116 speeding up, leading to the liquid level decreasing at point 304.

At point 318, the pumping down of the well causes gas liberation to begin, which causes sharp downward fluctuations in motor current, followed by sharp upward fluctuations, both shown here as spikes. These sharp variations in motor current are due to gas interference, i.e., the density of material being lifted by the pump suddenly decreases as the liquid fillage decreases because discontinuous gas flow is entering the pump 112, then motor current returns to a higher level as liquid fillage increases again. The calculated Gas Production Index increases as a result of the gas interference, as shown at point 310, for example.

The controller 200 responsively decreases motor speed at point 320 because the calculated Gas Production Index value is at risk of overshooting the target Gas Production Index value 312, which leads to a temporary reduction in gas liberation. The calculated Gas Production Index decreases in response to the change in motor speed, as shown at point 322. The controller 200 then responsively increases motor speed again as shown from point 320 to point 324, where gas liberation begins to occur again, causing further fluctuations in motor current.

The controller continues to adjust conditions so that the calculated Gas Production Index approaches the target Gas Production Index value, ideally as quickly as possible without significant overshoot, or at least as well as the random, sporadic nature of slug flow will allow. In this manner, the well will preferably reach a stable operating condition where sufficient liberated gas is removed by the ESP to prevent gas interference from becoming too significant (which could lead to a gas lock condition), while fluid production nonetheless continues.

FIG. 4 illustrates the logic operations 400 performed by the controller 200 for an ESP system 100 according to an aspect. The controller 200 generally implements a repeating control loop that typically does not end unless expressly halted by a user or unless an error condition arises. A user might halt well operations to conduct repairs or equipment upgrades, for example.

At 402, the controller 200 monitors data indicating motor current values for the downhole ESP. The data may comprise time-series data transmitted from the variable-frequency drive 104 to the controller 200 via channel 228 in real time, or from current sensor(s) connected to the variable-frequency drive 104 that can transmit time-series data to the controller 200 via channel 228 in real time. As previously noted, the controller 200 may monitor the data for a span of time or for a number of samples.

At 404, the controller 200 calculates a value for the Gas Production Index using the methodology previously described. The Gas Production Index value indicates a relative level of gas liberation occurring in the well. This calculated Gas Production Index, value, based on the ESP motor current, is to be adjusted to maintain gas removal by the ESP system 100 even during sporadic slug flow from the productive formation.

At 406, the controller 200 compares the calculated Gas Production Index value to a predetermined target Gas Production Index value. If the calculated value is higher than the target value, this may indicate that the well has been pumped down too far, so an excess of gas is being liberated, which could lead to excessive gas interference or gas lock in the worst case scenario. In contrast, if the calculated value is lower than the target value, this may indicate the well has not been pumped down sufficiently, so any gas that could be liberated is not being advantageously produced. Note that the monitoring of data and estimation of Gas Production Index values is an ongoing process to enable continuous proportional adjustment, in contrast to controllers that are reactive when an alarm condition is met.

At 408, in response to determining that the Gas Production Index value is too high, inferring a gas interference condition could be developing, the controller 200 responsively decreases the speed of the ESP motor 116. The adjustment may be carried out by a PID algorithm, in an aspect. Such an adjustment algorithm may be trained by exposure to data from multiple wells that are experiencing gas interference and from multiple wells that are not experiencing gas interference, in an aspect. An artificial neural network is known to be a useful apparatus for implementation of such adaptive algorithms, and so may be part of the controller 200 logic circuitry, programming or cloud based implementation. Step 408 can include operating the ESP motor 116 at the decreased speed.

At 410, in response to determining that the Gas Production Index value does not meet the target Gas Production Index value, indicating that well production may be insufficient, the controller 200 activates actuators that increase the speed of the ESP motor 116 to a higher speed. Step 410 can include operating the ESP motor 116 at the increased speed.

At 412, the controller 200 determines if a halt request has been received or if an error condition has occurred. If either is true, then the controller 200 may halt its usually-ongoing operation of the ESP system 100. If neither is true, then the controller 200 may resume its ongoing operation of the ESP system 100, including the detection and correction of gas interference conditions as they may occur.

Additional Description

Aspect 1. A method for controlling gas production from a well, comprising: measuring data describing an electrical current provided to a downhole electrical submersible pump motor; calculating a Gas Production Index value indicating a relative gas production level of the well based on a signature analysis of the measured motor current data; and in response to a comparison of or comparing the calculated Gas Production Index value against a target Gas Production Index value, adjusting a speed of the motor to control the relative gas production level.

Aspect 2. The method of Aspect 1, further comprising: before adjusting, operating the motor at a first speed; after adjusting, operating the motor at the adjusted speed to control the relative gas production level; or both steps.

Aspect 3. The method of Aspect 1, wherein the measured data comprises time-series data arriving from at least one sensor in real time, wherein the at least one sensor is a variable-frequency drive or a sensor connected to the variable-frequency drive.

Aspect 4. The method of any one of Aspects 1 to 3, wherein calculating a Gas Production Index value comprises: calculating an actual motor current $i_c$ from the measured data by adjusting the measured data from a variable-frequency drive, step up transformer impedance ratio, cable resistance, and temperature; calculating a filtered motor current $i_f$ by filtering the calculated motor current with a first filter having a first cutoff frequency of $\omega_{in}$ radians per second; calculating a normalized motor current $I_N$ as a ratio of the filtered motor current $i_f$ divided by a rated motor current $i_R$ such that for sample number n, $$I_{N_n} = \frac{i_f}{i_R};$$

calculating a moving average motor current $A_{IN}$, of s samples of the normalized motor current $I_N$, where $n>(s+1)$ and where $$A_{I_n} = \frac{1}{s}\sum_{n-s}^{s+n} I_{N_n};$$

calculating a Gas Production Index quotient $$Q_n = \log \text{ of } \frac{A_{I_n}}{\sqrt{\frac{\sum_{n-s}^{s+n}\left(I_{N_n} - A_{I_n}\right)^2}{s}}};$$

calculating an unfiltered Gas Production Index $$GPI_u = \left(\frac{G_p}{Q_n} - K_f\right) \times \left(\frac{Z_{max} - Z_{min}}{K_c - K_f}\right) + Z_{min},$$

where $G_p$ comprises a Gas Production Index gain, $K_f$ comprises a noise floor constant, $Z_{max}$ comprises a maximum scale constant, $Z_{min}$ comprises a minimum scale constant, and $K_c$ comprises a noise ceiling constant; and filtering the unfiltered Gas Production Index $GPI_u$ through a low-pass filter having a second cutoff frequency of $\omega_{out}$ radians per second to yield the Gas Production Index value.

Aspect 5. The method of any one of Aspects 1 to 4, further comprising: adjusting the speed of the motor by actuating a variable-frequency drive that modifies electrical power signals provided to the motor.

Aspect 6. The method of any one of Aspects 1 to 5, further comprising: avoiding a need for additional instrumentation because the motor serves as both a sensor and an actuator.

Aspect 7. The method of any one of Aspects 1 to 6, further comprising: selecting the target Gas Production Index value to maximize continuous fluid production to: i) prevent damage to the motor, ii) reduce gas interference to prevent gas lock, iii) avoid a reactive gas lock recovery scheme, or iv) combinations thereof.

Aspect 8. The method of any one of Aspects 1 to 7, wherein the Gas Production Index value enables qualitative measurement and control of a fluid level in the well and a pump intake pressure.

Aspect 9. The method of any one of Aspects 1 to 8, further comprising: in response to a comparison of or comparing the calculated Gas Production Index value against a target Gas Production Index value, adjusting a choke valve, an annulus pressure regulator, or both the choke valve and the annulus pressure regulator.

Aspect 10. A non-transitory computer-readable storage medium having embedded therein a set of instructions which, when executed by one or more processors of a computer, causes the computer to execute operations for controlling gas production from a well, the operations comprising: measuring data describing an electrical current provided to a downhole electrical submersible pump motor; calculating a Gas Production Index value indicating a relative gas production level of the well based on a signature analysis of the measured motor current data; and in response to a comparison of or comparing the calculated Gas Production Index value against a target Gas Production Index value, adjusting a speed of the motor to control the relative gas production level.

Aspect 11. The medium of Aspect 10, wherein the measured data comprises time-series data arriving from at least one sensor in real time, wherein the at least one sensor is a variable-frequency drive or a sensor connected to the variable-frequency drive.

Aspect 12. The medium of any one of Aspects 10 or 11, wherein calculating a Gas Production Index value comprises: calculating an actual motor current $i_c$ from the measured data by adjusting the measured data from a variable-frequency drive, step up transformer impedance ratio, cable resistance, and temperature; calculating a filtered motor current $i_f$ by filtering the calculated motor current with a first filter having a first cutoff frequency of $\omega_{in}$ radians per second; calculating a normalized motor current $I_N$ as a ratio of the filtered motor current $i_f$ divided by a rated motor current $i_R$ such that for sample number n, $$I_{N_n} = \frac{i_f}{i_R};$$

calculating a moving average motor current $A_{I_n}$ of s samples of the normalized motor current $I_N$, where n>(s+1) and where $$A_{I_n} = \frac{1}{s}\sum_{n-s}^{s+n} I_{N_n};$$

calculating a Gas Production Index quotient $$Q_n = \log \text{ of } \frac{A_{I_n}}{\sqrt{\dfrac{\sum_{n-s}^{s+n}\left(I_{N_n} - A_{I_n}\right)^2}{s}}};$$

calculating an unfiltered Gas Production Index $$GPI_u = \left(\frac{G_p}{Q_n} - K_f\right)\times\left(\frac{Z_{max} - Z_{min}}{K_c - K_f}\right) + Z_{min},$$

where $G_p$ comprises a Gas Production Index gain, $K_f$ comprises a noise floor constant, $Z_{max}$ comprises a maximum scale constant, $Z_{min}$ comprises a minimum scale constant, and $K_c$ comprises a noise ceiling constant; and filtering the unfiltered Gas Production Index $GPI_u$ through a low-pass filter having a second cutoff frequency of $\omega_{out}$ radians per second to yield the Gas Production Index value.

Aspect 13. The medium of any one of Aspects 10 to 12, the operations further comprising: adjusting the speed of the motor by actuating a variable-frequency drive that modifies electrical power signals provided to the motor.

Aspect 14. The medium of any one of Aspects 10 to 13, the operations further comprising: avoiding a need for additional instrumentation because the motor serves as both a sensor and an actuator.

Aspect 15. The medium of any one of Aspects 10 to 14, the operations further comprising: selecting the target Gas Production Index value to maximize continuous fluid production to: i) prevent damage to the motor, ii) reduce gas interference to prevent gas lock, iii) avoid a reactive gas lock recovery scheme, or iv) combinations thereof.

Aspect 16. The medium of any one of Aspects 10 to 15, wherein the Gas Production Index value enables qualitative measurement and control of a fluid level in the well and a pump intake pressure.

Aspect 17. The medium of any one of Aspects 10 to 16, the operations further comprising: in response to a comparison of or comparing the calculated Gas Production Index value against a target Gas Production Index value, adjusting a choke valve, an annulus pressure regulator, or both the choke valve and the annulus pressure regulator.

Aspect 18. An apparatus for controlling gas production from a well, comprising: a downhole electrical submersible pump motor; a variable-frequency drive that provides electrical power signals to the pump motor; and a controller configured to: measure data describing an electrical current provided to the motor; calculate a Gas Production Index value indicating a relative gas production level of the well based on a signature analysis of the measured motor current data; and in response to a comparison of or comparing the calculated Gas Production Index value against a target Gas Production Index value, adjust a speed of the motor to control the relative gas production level by actuating the variable-frequency drive to modify the electrical power signals provided to the motor.

Aspect 19. The apparatus of Aspect 18, wherein the controller is further configured to before adjusting, operate the motor at a first speed; after adjusting, operate the motor at the adjusted speed to control the relative gas production level; or both steps.

Aspect 20. The apparatus of Aspect 18 or 19, wherein the measured data comprises time-series data arriving from at least one sensor in real time, wherein the at least one sensor is the variable-frequency drive or a sensor connected to the variable-frequency drive.

Aspect 21. The apparatus of one of Aspects 18 to 20, wherein calculate a Gas Production Index value comprises: calculate an actual motor current $i_c$ from the measured data by adjusting the measured data from a variable-frequency drive, step up transformer impedance ratio, cable resistance, and temperature; calculate a filtered motor current $i_f$ by filtering the calculated motor current with a first filter having a first cutoff frequency of $\omega_{in}$ radians per second; calculate a normalized motor current $I_N$ as a ratio of the filtered motor current $i_f$ divided by a rated motor current $i_R$ such that for sample number n, $$I_{N_n} = \frac{i_f}{i_R};$$

calculate a moving average motor current $A_{I_n}$ of s samples of the normalized motor current $I_N$, where n>(s+1) and where $$A_{I_n} = \frac{1}{s} \sum\nolimits_{n-s}^{s+n} I_{N_n};$$

calculate a Gas Production Index quotient $$Q_n = \log \text{ of } \frac{A_{I_n}}{\sqrt{\frac{\sum_{n-s}^{s+n}\left(I_{N_n} - A_{I_n}\right)^2}{s}}};$$

calculate an unfiltered Gas Production Index $$GPI_u = \left(\frac{G_p}{Q_n} - K_f\right) \times \left(\frac{Z_{max} - Z_{min}}{K_c - K_f}\right) + Z_{min},$$

where $G_p$ comprises a Gas Production Index gain, $K_f$ comprises a noise floor constant, $Z_{max}$ comprises a maximum scale constant, $Z_{min}$ comprises a minimum scale constant, and $K_c$ comprises a noise ceiling constant; and filter the unfiltered Gas Production Index $GPI_u$ through a low-pass filter having a second cutoff frequency of $\omega_{out}$ radians per second to yield the Gas Production Index value.

Aspect 22. The apparatus of any one of Aspects 18 to 21, wherein the controller is further configured to: adjust the speed of the motor by actuating a variable-frequency drive that modifies electrical power signals provided to the motor.

Aspect 23. The apparatus of any one of Aspects 18 to 22, wherein the controller is further configured to: avoid a need for additional instrumentation because the motor serves as both a sensor and an actuator.

Aspect 24. The apparatus of any one of Aspects 18 to 23, wherein the controller is further configured to: select the target Gas Production Index value to maximize continuous fluid production to: i) prevent damage to the motor, ii) reduce gas interference to prevent gas lock, iii) avoid a reactive gas lock recovery scheme, or iv) combinations thereof.

Aspect 25. The apparatus of any one of Aspects 18 to 24, wherein the Gas Production Index value enables qualitative measurement and control of a fluid level in the well and a pump intake pressure.

Aspect 26. The apparatus of any one of Aspects 18 to 25, wherein the controller is further configured to: in response to a comparison of or comparing the calculated Gas Production Index value against a target Gas Production Index value, adjust a choke valve, an annulus pressure regulator, or both the choke valve and the annulus pressure regulator.

As used herein, the term component might describe a given unit of functionality that may be performed in accordance with one or more aspects of the technology disclosed herein. As used herein, a component might be implemented utilizing any form of hardware, software, or a combination thereof. For example, one or more processors, controllers, ASICs, programmable logic arrays (PLAs), programmable array logics (PALs), complex programmable logic devices (CPLDs), FPGAs, logical components, software routines or other mechanisms might be implemented to make up a component. Hardware logic, including programmable logic for use with a programmable logic device (PLD) implementing all or part of the functionality previously described herein, may be designed using traditional manual methods or may be designed, captured, simulated, or documented electronically using various tools, such as Computer Aided Design (CAD) programs, a hardware description language (e.g., VHDL or AHDL), or a PLD programming language. Hardware logic may also be generated by a non-transitory computer-readable medium storing instructions that, when executed by a processor, manage parameters of a semiconductor component, a cell, a library of components, or a library of cells in electronic design automation (EDA) software to generate a manufacturable design for an integrated circuit. In implementation, the various components described herein might be implemented as discrete components or the functions and features described may be shared in part or in total among one or more components. The various features and functionality described herein may be implemented in any given application and may be implemented in one or more separate or shared components in various combinations and permutations. Even though various features or elements of functionality may be individually described or claimed as separate components, these features and functionality may be shared among one or more common software and hardware elements, and such description shall not require or imply that separate hardware or software components are used to implement such features or functionality.

Although the present disclosure and its advantages have been described in detail, it should be understood that various changes, substitutions, and alterations may be made herein without departing from the scope of the disclosure as defined by the appended claims. Moreover, the scope of the present application is not intended to be limited to the particular aspects of the process, machine, manufacture, composition of matter, means, methods, and steps described in the specification. As can be appreciated from the disclosure, processes, machines, manufacture, compositions of matter, means, methods, or steps, presently existing or later to be developed that perform substantially the same function or achieve substantially the same result as the corresponding aspects described herein may be utilized according to the present disclosure. Accordingly, the appended claims are intended to include within their scope such processes, machines, manufacture, compositions of matter, means, methods, or steps.

What is claimed is:

1. A method for controlling gas production from a well, comprising:

measuring motor current data describing an electrical current provided to a motor of a downhole electrical submersible pump;

calculating a Gas Production Index value indicating a relative gas production level of the well based on a signature analysis of the measured motor current data, wherein calculating a Gas Production Index value comprises:

calculating an actual motor current $i_c$ from the measured motor current data by adjusting the measured motor current data from a variable-frequency drive, step up transformer impedance ratio, cable resistance, and temperature;

calculating a filtered motor current $i_f$ by filtering the actual motor current with a first filter having a first cutoff frequency of $\omega_{in}$ radians per second;

calculating a normalized motor current $I_N$ as a ratio of the filtered motor current $i_f$ divided by a rated motor current $I_R$ such that for sample number n, $$I_{N_n} = \frac{i_f}{i_R};$$

calculating a moving average motor current $A_{I_n}$ of s samples of the normalized motor current $I_N$, where n≥(s+1) and where $$A_{I_n} = \frac{1}{s} \sum_{n-s}^{s+n} I_{N_n};$$

calculating a Gas Production Index quotient $$Q_n = \log \text{ of } \frac{A_{I_n}}{\sqrt{\frac{\sum_{n-s}^{s+n}(I_{N_n} - A_{I_n})^2}{s}}};$$

calculating an unfiltered Gas Production Index $$GPI_u = \left(\frac{G_p}{Q_n} - K_f\right) \times \left(\frac{Z_{max} - Z_{min}}{K_c - K_f}\right) + Z_{min},$$

where $G_p$ comprises a Gas Production Index gain, $K_f$ comprises a noise floor constant, $Z_{max}$ comprises a maximum scale constant, $Z_{min}$ comprises a minimum scale constant, and $K_c$ comprises a noise ceiling constant, and filtering the unfiltered Gas Production Index $GPI_u$ through a low-pass filter having a second cutoff frequency of $\omega_{out}$ radians per second to yield the Gas Production Index value;

comparing the calculated Gas Production Index value against a target Gas Production Index value; and adjusting a first speed of the motor to an adjusted speed, to control the relative gas production level.

2. The method of claim 1, further comprising:

before adjusting, operating the motor at the first speed; and after adjusting, operating the motor at the adjusted speed.

3. The method of claim 1, wherein adjusting the first speed of the motor to the adjusted speed comprises:

actuating a variable-frequency drive that modifies electrical power signals provided to the motor.

4. The method of claim 1, further comprising:

avoiding a need for additional instrumentation because the motor serves as both a sensor and an actuator.

5. The method of claim 1, wherein the measured motor current data comprises time-series data arriving from at least one sensor in real time, wherein the at least one sensor is a variable-frequency drive or a sensor connected to the variable-frequency drive.

6. The method of claim 1, further comprising:

selecting the target Gas Production Index value to maximize continuous fluid production to: i) prevent damage to the motor, ii) reduce gas interference to prevent gas lock, iii) avoid a reactive gas lock recovery scheme, or iv) combinations thereof.

7. The method of claim 1, wherein the Gas Production Index value enables qualitative measurement and control of a fluid level in the well and a pump intake pressure.

8. The method of claim 1, further comprising:

in response to comparing the calculated Gas Production Index value against a target Gas Production Index value, adjusting a choke valve, an annulus pressure regulator, or both the choke valve and the annulus pressure regulator.

9. An apparatus for controlling gas production from a well, comprising:

a motor of a downhole electrical submersible pump;

a variable-frequency drive that provides electrical power signals to the motor; and a controller configured to:

measure motor current data describing an electrical current provided to the motor;

calculate a Gas Production Index value indicating a relative gas production level of the well based on a signature analysis of the measured motor current data, wherein calculate a Gas Production Index value comprises:

calculate an actual motor current $i_c$ from the measured motor current data by adjusting the measured motor current data from a variable-frequency drive, step up transformer impedance ratio, cable resistance, and temperature;

calculate a filtered motor current $i_f$ by filtering the actual motor current with a first filter having a first cutoff frequency of $\omega_{in}$ radians per second;

calculate a normalized motor current $I_N$ as a ratio of the filtered motor current $i_f$ divided by a rated motor current $i_p$ such that for sample number n, $$I_{N_n} = \frac{i_f}{i_R};$$

calculate a moving average motor current $A_{I_n}$ of s samples of the normalized motor current $I_N$, where n>(s+1) and where $$A_{I_n} = \frac{1}{s} \sum_{n-s}^{s+n} I_{N_n};$$

21 calculate a Gas Production Index quotient $$Q_n = \log \text{ of } \frac{A_{I_n}}{\sqrt{\dfrac{\sum_{n-s}^{s+n}\left(I_{N_n} - A_{I_n}\right)^2}{s}}};$$

calculate an unfiltered Gas Production Index $$GPI_u = \left(\frac{G_p}{Q_n} - K_f\right) \times \left(\frac{Z_{max} - Z_{min}}{K_c - K_f}\right) + Z_{min},$$

where $G_p$ comprises a Gas Production Index gain, $K_f$ comprises a noise floor constant, $Z_{max}$ comprises a maximum scale constant, $Z_{min}$ comprises a minimum scale constant, and $K_c$ comprises a noise ceiling constant; and filter the unfiltered Gas Production Index $GPI_u$ through a low-pass filter having a second cutoff frequency of $\omega_{out}$ radians per second to yield the Gas Production Index value;

compare the calculated Gas Production Index value against a target Gas Production Index value; and adjust a first speed of the motor to an adjusted speed to control the relative gas production level.

10. The apparatus of claim 9, wherein before the controller adjusts the first speed to the adjusted speed, the motor operates at the first speed; wherein after the controller adjusts the first speed to the adjusted speed, the motor operates at the adjusted speed.

11. The apparatus of claim 9, wherein to adjust the first speed of the motor to the adjusted speed, the controller is configured to:

actuate the variable-frequency drive to modify the electrical power signals provided to the motor.

12. The apparatus of claim 9, wherein the measured motor current data comprises time-series data arriving from at least one sensor in real time, wherein the at least one sensor is the variable-frequency drive or a sensor connected to the variable-frequency drive.

13. The apparatus of claim 9, wherein the controller is further configured to:

adjust the first speed of the motor to the adjusted speed by actuating a variable-frequency drive that modifies electrical power signals provided to the motor.

14. The apparatus of claim 9, wherein the controller is further configured to:

avoid a need for additional instrumentation because the motor serves as both a sensor and an actuator.

15. The apparatus of claim 9, wherein the controller is further configured to:

select the target Gas Production Index value to maximize continuous fluid production to: i) prevent damage to the motor, ii) reduce gas interference to prevent gas lock, iii) avoid a reactive gas lock recovery scheme, or iv) combinations thereof.

16. The apparatus of claim 9, wherein the Gas Production Index value enables qualitative measurement and control of a fluid level in the well and a pump intake pressure.

17. The apparatus of claim 9, wherein the controller is further configured to:

in response to comparing the calculated Gas Production Index value against a target Gas Production Index value, adjust a choke valve, an annulus pressure regulator, or both the choke valve and the annulus pressure regulator.

18. A non-transitory computer-readable storage medium having embedded therein a set of instructions which, when executed by one or more processors of a computer, causes the computer to execute operations for controlling gas production from a well, the operations comprising:

measuring motor current data describing an electrical current provided to a downhole electrical submersible pump motor;

calculating a Gas Production Index value indicating a relative gas production level of the well based on a signature analysis of the measured motor current data, wherein calculating a Gas Production Index value comprises:

calculating an actual motor current $i_c$ from the measured motor current data by adjusting the measured motor current data from a variable-frequency drive, step up transformer impedance ratio, cable resistance, and temperature;

calculating a filtered motor current $i_f$ by filtering the actual motor current with a first filter having a first cutoff frequency of $\omega_{in}$ radians per second;

calculating a normalized motor current $I_N$ as a ratio of the filtered motor current $i_f$ divided by a rated motor current $i_p$ such that for sample number n, $$I_{N_n} = \frac{i_f}{i_R};$$

calculating a moving average motor current $A_{I_n}$ of s samples of the normalized motor current $I_N$, where n>(s+1) and where $$A_{I_n} = \frac{1}{s}\sum_{n-s}^{s+n} I_{N_n};$$

calculating a Gas Production Index quotient $$Q_n = \log \text{ of } \frac{A_{I_n}}{\sqrt{\dfrac{\sum_{n-s}^{s+n}\left(I_{N_n} - A_{I_n}\right)^2}{s}}};$$

calculating an unfiltered Gas Production Index $$GPI_u = \left(\frac{G_p}{Q_n} - K_f\right) \times \left(\frac{Z_{max} - Z_{min}}{K_c - K_f}\right) + Z_{min},$$

where $G_p$ comprises a Gas Production Index gain, $K_f$ comprises a noise floor constant, $Z_{max}$ comprises a maximum scale constant $Z_{min}$ comprises a minimum scale constant, and $K_c$ comprises a noise ceiling constant; and filtering the unfiltered Gas Production Index $GPI_u$ through a low-pass filter having a second cutoff frequency of $\omega_{out}$ radians per second to yield the Gas Production Index value;

comparing the calculated Gas Production Index value against a target Gas Production Index value; and adjusting a speed of a motor of a downhole electric submersible pump to control the relative gas production level.

\* \* \* \* \*